US 6,678,677 B2

(12) United States Patent
Roux et al.

(10) Patent No.: US 6,678,677 B2
(45) Date of Patent: Jan. 13, 2004

(54) APPARATUS AND METHOD FOR INFORMATION RETRIEVAL USING SELF-APPENDING SEMANTIC LATTICE

(75) Inventors: Claude Roux, Grenoble (FR); Denys Proux, Grenoble (FR); Eric Gaussier, Eybens (FR)

(73) Assignee: Xerox Corporation, Stamford, CT (US)

( * ) Notice: Subject to any disclaimer, the term of this patent is extended or adjusted under 35 U.S.C. 154(b) by 307 days.

(21) Appl. No.: 09/738,991

(22) Filed: Dec. 19, 2000

(65) Prior Publication Data

US 2002/0111941 A1 Aug. 15, 2002

(51) Int. Cl.[7] ............................................... G06F 17/30
(52) U.S. Cl. ......................................................... 707/3
(58) Field of Search ................................ 707/1, 3, 100

(56) References Cited

U.S. PATENT DOCUMENTS

| | | | | | |
|---|---|---|---|---|---|
| 5,873,056 | A | * | 2/1999 | Liddy et al. | 704/9 |
| 5,933,822 | A | * | 8/1999 | Braden-Harder et al. | 707/5 |
| 5,940,821 | A | * | 8/1999 | Wical | 707/3 |
| 6,226,632 | B1 | * | 5/2001 | Takahashi et al. | 707/3 |
| 6,240,407 | B1 | * | 5/2001 | Chang et al. | 707/2 |
| 6,295,529 | B1 | * | 9/2001 | Corston-Oliver et al. | 707/3 |

OTHER PUBLICATIONS

Aït–Mokhtar S., Chanod J.P., (1997). "Incremental Finite–State Parsing." *Proceedings of ANLP'97*, Washington Mar. 13st to Apr. 3rd, 1997, pp. 72–79.
Berrut, C. "Indexing medical reports: the RIME approach." Information Processing and Management, 26(1), 93–109, 1990.

Bouaud J, Bachimont B, Charlet J, and Zweigenbaum P., "Methodological principles for structuring an 'ontology'", in IJCAI'95 Workshop on "Basic Ontological Issues in Knowledge Sharing", Aug. 1995.
Fagan, J. L. "The effectiveness of a nonsyntactic approach to automatic phrase indexing for document retrieval". Journal of the American Society for Information Science, 40(2), 115–132, 1989.
Mauldin M., L. "Retrieval performance in FERRET: A conceptual information retrieval system". In A. Bookstein, Y. Chiaramelle, G. Salton, & V.V. Rahavan (Eds.), SIGIR'91: Proceedings of the Fourteenth Annual International ACM/SIGIR Conference on Research and Development in Information Retrieval, 347–355. New York: ACM Press, 1991.
Richardson R., Smeaton Alan F. and Murphy J. (1994). "Using WordNet as a Knowledge Base for Measuring Semantic Similarity between Words", Working Paper: CA–1294, School of Computer Applications, Dublin City University, Ireland, 1994.

(List continued on next page.)

Primary Examiner—Safet Metjahic
Assistant Examiner—Sana Al-Hashemi
(74) Attorney, Agent, or Firm—Oliff & Berridge, PLC

(57) ABSTRACT

An information retrieval apparatus retrieves information from databases comprising internal representations of documents. Syntactic relations between terms of the query are extracted and an internal representation of the query is created based on the terms of the query and the extracted syntactic relations. New terms are appended to a semantic lattice if the query includes terms not included in the semantic lattice. The query is projected onto the documents in the database by comparing the internal representation and terms of the query to the internal representations and terms of the documents using the semantic lattice for comparing the terms and a similarity is computed between the query and each document. The documents are ranked according to their computed similarities and are output as retrieved documents according to the established rank order.

18 Claims, 12 Drawing Sheets

OTHER PUBLICATIONS

Sowa, J.F. "Lexical structures and conceptual structures", in Pustejovsky (Ed.), J. Semantics in the lexicon, Kluwer, pp. 223–263, 1993.

Sowa, J.F. Conceptual Graphs in Chapter 3 of Conceptual Structures: Information Processing in Mind and Machine Reading, MA:Addison–Wesley, 1984, pp. 69–123, 1984.

Zweigenbaum P, Bachimont B, Bouaud J, Charlet J, and Boisvieux JF, "Issues in the structuring and acquisition of an ontology for medical language understanding", in Methods of Information in Medicine, 34(1):15–24, 1995.

Zweigenbaum et al., "Menelas: An Experiment in the Processing of Natural Language Medical Records", AIM Project A2023, Final Report WP 3.3, pp. 1–153 Oct. 7, 1995. With specific reference to: Parser: section 3.2.2, pp. 19–22, Semantic Analysis: section 5.2, pp. 27–29 and 35–41; and Analyser: section 8.2.2, pp. 63–66.

* cited by examiner

APPARATUS AND METHOD FOR INFORMATION RETRIEVAL USING SELF-APPENDING SEMANTIC LATTICE

BACKGROUND OF THE INVENTION

1. Field of the Invention

This invention is concerned with an information retrieval apparatus and method which allow the user to retrieve information from databases, such as document databases, containing a plurality of documents.

2. Background of the Invention

Information retrieval systems serve to retrieve those documents that are relevant to the information needs of a user. With the explosive growth of the use of databases and the Internet, information retrieval increasingly fails to enable efficient retrieval of available information. The problem lies at both ends of the system. At one end, there is the ever increasing number of documents that vary widely in content, format and quality. At the other end, there is a huge number of unknown users with extremely diverse needs, skills, educational, cultural, and language backgrounds. Conventional search method and apparatus are, however, not sophisticated enough to provide satisfactory solutions. The search capabilities of conventional search methods and apparatus are designed either for high recall and the "average user", or for searches of high precision. Both approaches may not retrieve the desired information, although available within a database.

In general, the relevant information contained in the documents is constructed and extracted according to a normalized representation. This representation is abstracted away from its original linguistic form. Database queries of a user are generally subjected to a processing in order to expand the scope of the query and/or to interpret the query syntax. The extracted query information is then matched against the stored representations in order to retrieve specific information contained in the documents.

Those documents which are the most similar to the query are output as retrieved documents.

Different methods exist to find those documents relevant to the query. Statistical methods count the number of times each word of the query appears in each document. Documents in a database are ranked according to the obtained count values. If the number of words in a query is not sufficient, less than two or three words, the number of words may prove to be insufficient to find the documents relevant to the request.

Other approaches use a refined document preprocessing which is based on a deep parsing procedure applying a complex grammatical analysis on the documents to extract an entire sentence dependency structure. Such approaches generally require a huge computational effort without providing satisfactory results. As complex sentences are difficult to analyze, even a complete dependency analysis may only return several possible dependency structures for a single sentence. Other information retrieval systems expand the scope of a query taking semantic relations of words into account. It turned out, that such an approach does not return better results.

For evaluating retrieval performance of information retrieval systems, two criteria are used, namely the "calling rate" and the "precision". These criteria are based on the subjective point of view on the relevance of retrieved information. The "calling rate" or "recall" and the "precision" are defined as follows.

The calling rate or recall is a ratio of the number of pertinent documents retrieved to the total number of pertinent documents stored in the database, the precision is a ratio of the number of pertinent documents retrieved to the number of all documents retrieved. There is usually a trade-off between these two criteria. In information retrieval, it is desirable that these two criteria are in proximity to the maximum value of one.

Most traditional information retrieval systems are optimized for longer queries and perform worse for short, more realistic queries. According to surveys made on the Internet, the average request comprises only a few words (mostly less that five words).

SUMMARY OF THE INVENTION

The present invention has been made in consideration of the above situation, and it is the primary object of the present invention to provide an improved method and an improved apparatus that retrieve information from a database.

It is a further object of the invention to provide a method and an apparatus for information retrieval that improve the ranking of retrieved documents.

It is another object of the invention to provide a method and an apparatus for information retrieval that pushes the most salient documents on top of a list of retrieved documents.

It is still another object of the invention to provide a method and an apparatus that increases the proportion of relevant documents retrieved from a document database.

It is still another object of the present invention to provide a method and an apparatus that retrieve information from a database with a higher precision.

It is yet another object of the invention to provide a method and an apparatus that increase effectiveness of information retrieval.

These and other objects of the present invention may become apparent hereafter.

To achieve these objects, the present invention provides a method and an apparatus that combine the use of syntactic constructions with an enlargement of terms for documents and queries to improve precision and calling rate for information retrieval. The method for document retrieval of the present invention relates to databases comprising internal representations of documents wherein the internal representations include syntactic relations between terms of sentences of the documents and a semantic lattice for the terms of the documents in the database, the semantic lattice specifying semantic relations between the terms. The method comprises the step of extracting syntactic relations between terms of the query and creating an internal representation of the query based on the terms of the query and the extracted syntactic relations between the terms of the query. Further, the method appends new terms to the semantic lattice if the query includes terms not included in the semantic lattice in the database. The query is projected onto the documents in the database by comparing the internal representation and terms of the query to the internal representations and terms of the documents using the semantic lattice for comparing the terms and a similarity is computed between the query and each document. The documents in the database are ranked according to their computed similarities, and the documents are output as retrieved documents according to the established rank order.

According to a second aspect of the present invention, there is provided an apparatus for retrieving documents from a database. The database comprises internal representations of documents wherein the internal representations include syntactic relations between terms of sentences of the documents and a semantic lattice for the terms of the documents in the database, the semantic lattice specifying the semantic relations between the terms. The apparatus comprises a query input unit, and query processing unit, a semantic lattice management unit, a matching unit and a presentation unit. The query input unit receives a query and provides the query to the query-processing unit. The query-processing unit creates an internal representation of the query based on the terms of the query and syntactic relations between the terms of the query. The semantic lattice management unit appends new terms to the semantic lattice if the query includes terms not included in the semantic lattice in the database. The matching unit projects the query onto each of the documents in the database by comparing the internal representation of the query to the internal representation of the documents using the semantic lattice for comparing the terms. The matching unit further computes a similarity between the query and each document. The presentation unit ranks the documents in the database according to the computed similarities and outputs documents as retrieved documents according to the established rank order.

Furthermore, the present invention provides a computer program product, for use in a computer system, for performing a retrieval of documents from a database. The database comprises internal representations of documents wherein the internal representations include syntactic relations between terms of sentences of the documents and a semantic lattice for the terms of the documents in the database, the semantic lattice specifying semantic relations between the terms. The computer program product performs steps of receiving a database query, extracting syntactic relations between terms of the query, creating an internal representation of the query based on the terms of the query and the extracted syntactic relations between the terms of the query and appending new terms to the semantic lattice if the query includes terms not included in the semantic lattice in the database. Further, the computer program product performs the steps of projecting the query onto each of the documents in the database by comparing the internal representations and terms of the query to the internal representation and terms of the documents using the semantic lattice for comparing the terms and computing similarities between the query and the documents. Finally, the documents in the database are ranked according to the computed similarities, and documents are output as retrieved documents according to the obtained rank order.

In preferred embodiments, further improvements can be achieved by additionally taking weighting factors into account when computing a similarity between a document and a query wherein the weighting factor depends on the semantic and syntactic similarity between a term of the query and a term of a document.

In another preferred embodiment, there is provided an internal representation of document information in the form of a conceptual graph wherein each node of the graph is either a term or a syntactic relation. The mechanism to compare graphs, the projection, is not based on a statistical method but on the combination of a lattice of concepts and the matching of each node of each graph one with the others, according to their structure. A statistical method can be used to extract a first broad set of documents which are then ranked according to the result of the projection of the query on each of those documents.

BRIEF DESCRIPTIONS OF THE DRAWINGS

The accompanying drawings are incorporated into and form a part of the specification to illustrate several examples of the present invention. These drawings together with the description serve to explain principles of the invention. The drawings are only for the purpose of illustrating preferred and alternative examples of how the invention can be made and used and are not to be construed as limiting the invention to only the illustrated and described examples. Further features and advantages will become apparent from the following description of the various embodiments of the invention, as illustrated in the accompanying drawings wherein:

DETAILED DESCRIPTION

Figure 1:
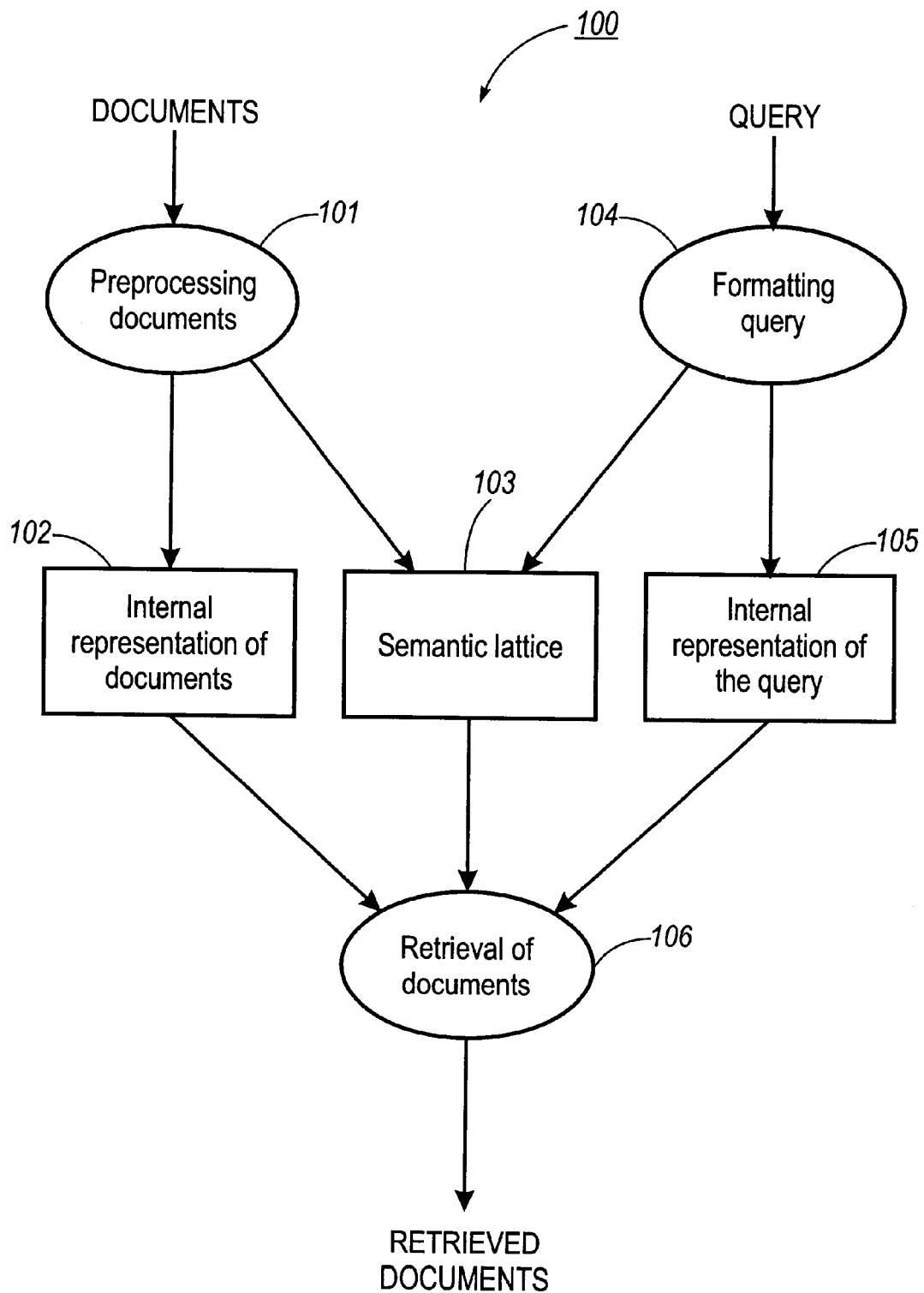
FIG. 1 illustrates a schematic diagram of a configuration of an information retrieval system.

The illustrative embodiments of the present invention will be described with reference to the drawings. Referring now to the drawings and particularly to FIG. 1, which illustrates a configuration of an information retrieval system 100, there is provided a "storage line" including a document preprocessing unit 101 and a unit 102 for storing internal representations of documents which are received from preprocessing unit 101.

Many databases use indexes for the most frequently requested information contained therein. In other words, each field of information for each record in the database is indexed. An index can be described as list of distinct attribute record values associated with pointers. By indexing individual fields of a database, queries on the index fields enjoy a fast response time. In a preferred embodiment, the preprocessing unit 101 creates an internal representation of all documents stored in a database as indexes for these documents.

Further, the preprocessing unit 101 generates a semantic lattice 103 which describes for each term in the documents the terms this term can be related to. For each new word of a document in the database, a thesaurus or ontology such as WordNet®, which is available on the Internet at [http://www.cogsci.Princeton.edu/~wn/], is used to enrich the lattice with all those words that are provided for the document word. Only one lattice is built for a set of documents in a database.

The configuration of an information retrieval system 101 as shown in FIG. 1 further comprises a "search line" which comprises a unit 104 for formatting a query and a unit 105 storing an internal representation of the query generated by the unit 104. In the formatting stage 104, the query is transformed into an internal representation, using the same methods as described for the documents stored in the database. As will be described below, preferably, a document and the query are transformed into a conceptual graph. The syntactic relations of the terms in the query are extracted and translated into an internal representation. In addition, terms of the query not included in any of the documents in the database are appended to the semantic lattice 103 in the same manner as new terms are added during the document preprocessing 101 procedure.

A retrieval of documents is performed by unit 106 based on the internal representations of the documents and the query by using the semantic relations between terms as stored in the semantic lattice 103. Based on the similarities computed at unit 106 between the internal representations stored at 102 and 105 and the terms which are calculated using the semantic lattice, a rank order of the documents is established and the documents are output according to the rank order as retrieved documents.

Figure 2:
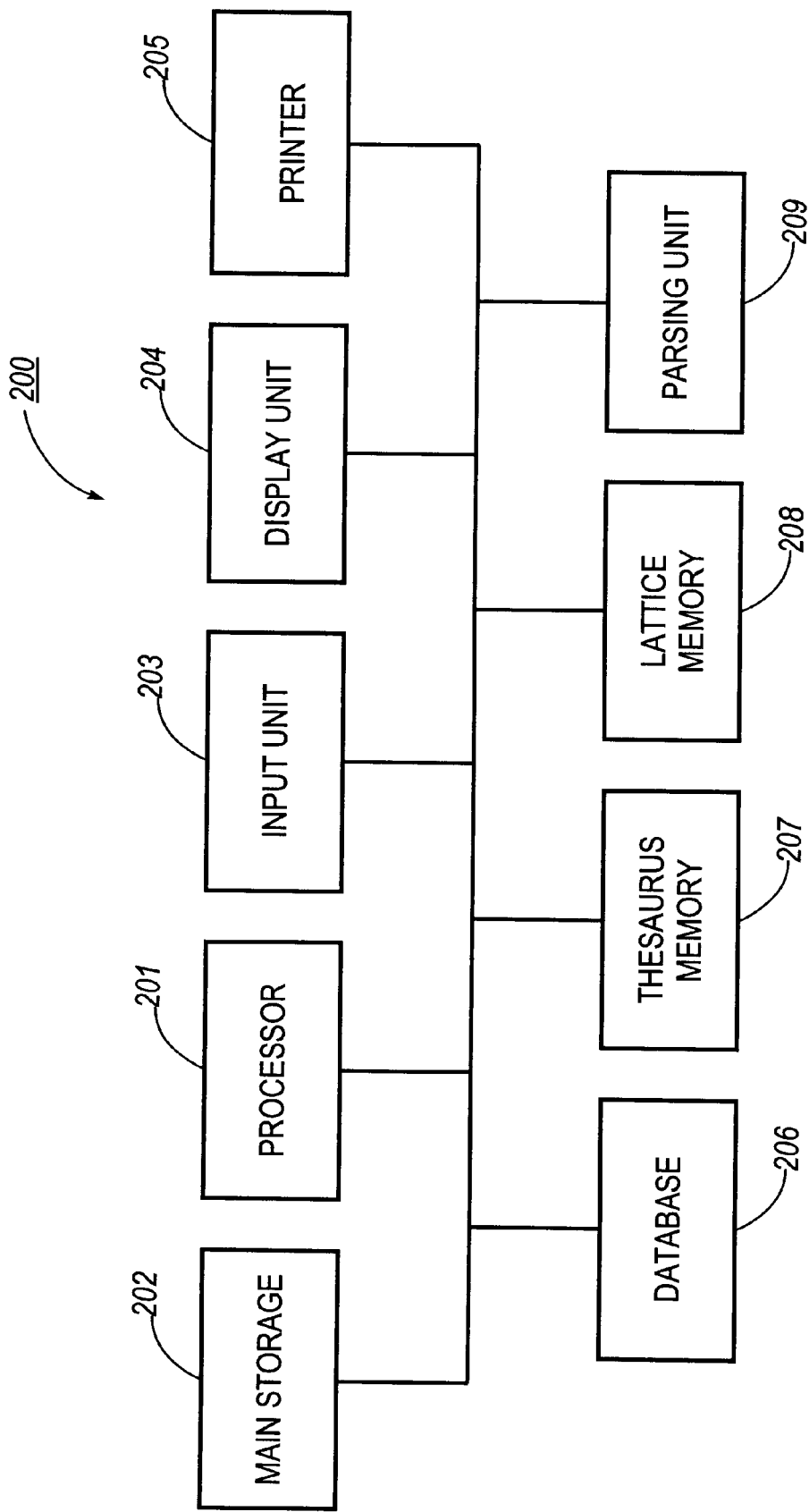
FIG. 2 illustrates a schematic diagram of a computer system.

As illustrated in FIG. 2, a computer system 200 according to the present invention comprises a processor 201 and a main storage 202 connected to the processor 201. The processor is further connected to an input unit 203 for input a database query by a user. The results of the query are displayed on a display unit 204 or may be printed out via printer 205. The information is retrieved from a database 206 included in the computer system 200. The database may be provided on a hard disk of a computer system or on particular storage media as CDs, DVDs or tape recording media. Alternatively, database 206 may be stored and a remote location connected to the computer system via a data transmission network. In a further alternative embodiment, database 206 may comprise documents stored in a plurality of computers connected in a network at high speed.

Processor 201 processes a query and may also be used to preprocess documents. For the document and query processing processor 201 uses a thesaurus memory 207. The thesaurus memory provides stored semantic relations between terms for a plurality of terms. Based on these semantic relations, processor 201 generates a semantic lattice stored in a lattice memory 208. As those skilled in the art will appreciate, the application of the method and the apparatus according to the present invention is not limited to particular memories. All or part of the memories 206, 207, 208 may be realized as a distinct area in a single memory.

As those skilled in the art will further appreciate, the computer system 200 preferably comprises main memory 202 for storing a program code, such as operating and application programs and data. The computer 200 preferably comprises an external memory, such as a hard-disk drive and floppy-disk drive, for storing the program code and data more permanently.

Computer system 200 may further comprise a parsing unit 209 in order to extract syntactic relations between terms of a sentence. Alternatively, parsing unit 209 may be provided as an application program to be performed by processor 201.

A process information retrieval will now be described in more detail with reference to the flow-chart diagrams as depicted in FIGS. 3 to 8.

Figure 3:
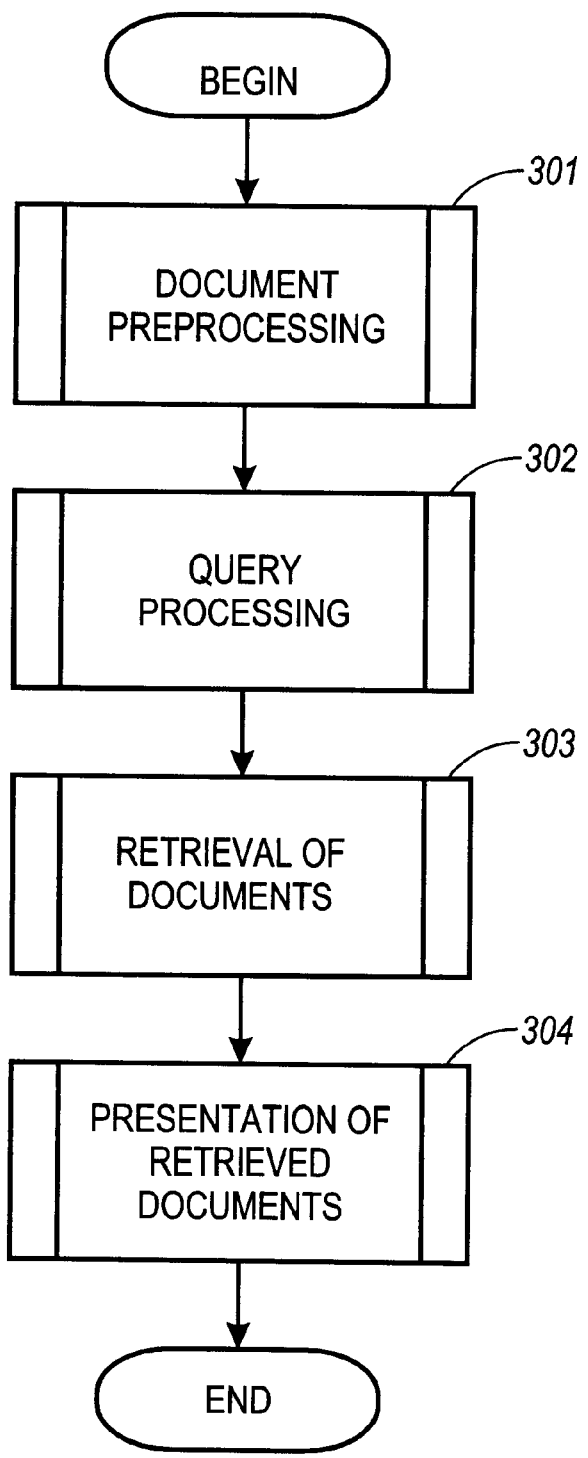
FIG. 3 is a flow-chart illustrating an information retrieval method according to a preferred embodiment of the present invention.

Before discussing the processing steps in detail, reference is made to FIG. 3 which illustrates the general steps in an information retrieval system. First, in a document preprocessing step 301 internal representations are generated for all documents in the database. Details of the document preprocessing are given in FIG. 4.

In order to retrieve documents from a document database, a user has to input a database query to find those documents relevant to the given input information. The received query is preprocessed in the computer system 200 in step 302 in order to be in a format which may be compared to the data stored in the database. The query processing procedure is described in more detail in FIG. 5.

For a retrieval of documents the query has to be compared with the stored document data. The retrieval of documents in step 303 is based on the similarity of each document with respect to the database query. The retrieved documents are presented in step 304 to the user based on the relevance of each document with respect to the database query. The retrieval and presentation steps 303 and 304 are illustrated with more detail in FIGS. 6 to 8.

Figure 4:
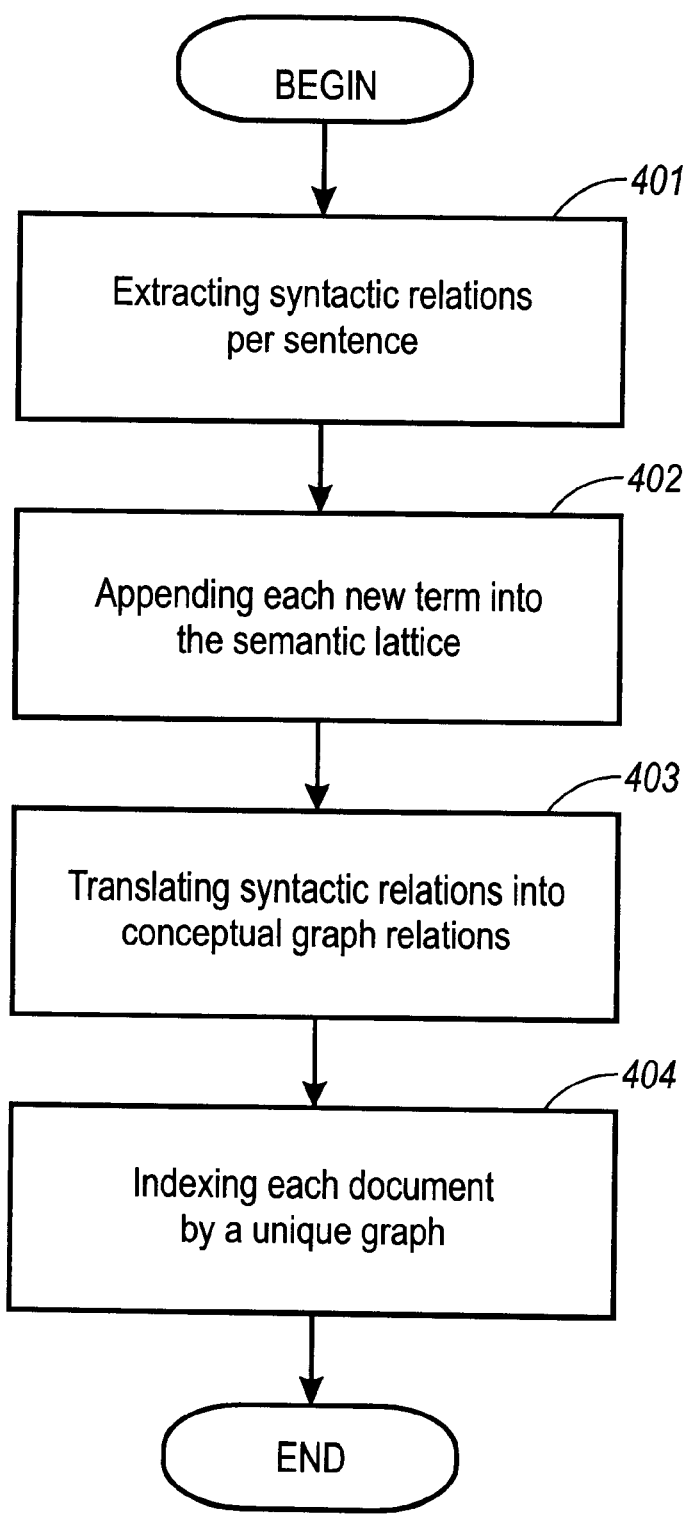
FIG. 4 is a flow-chart illustrating in more detail a document preprocessing step of the process depicted in FIG. 3.

Before discussing the information retrieval process, reference is made to FIG. 4 which illustrates in more detail the preprocessing of documents for obtaining a database according to the present invention. The manner of knowledge representation, namely the architecture of the database is an essential aspect of the present invention. This step will now be described in more detail. As those skilled in the art will appreciate, the particular knowledge representation and method of generating such knowledge representation is not restricted to a document retrieval application but may be a basis for knowledge extraction, automatic summarization, advanced queries in search engines, etc.

Each document of the database will be translated into an internal representation. In one particular embodiment of the present invention, "conceptual graphs" are used as an internal representation for the information of a sentence in a document. In the following, the notion of conceptual graphs will be presented.

A conceptual graph comprises a plurality of nodes each representing either a term (called "concept") or a syntactic relation. Each concept is connected to other concepts through relation nodes. Such syntactic relations may be "subject", "direct object", "adjectival attachment", "prepositional attachment", etc. The construction of a conceptual graph will now be explained with reference to the following sentence:

> The dog eats some soup.

Figure 9A:
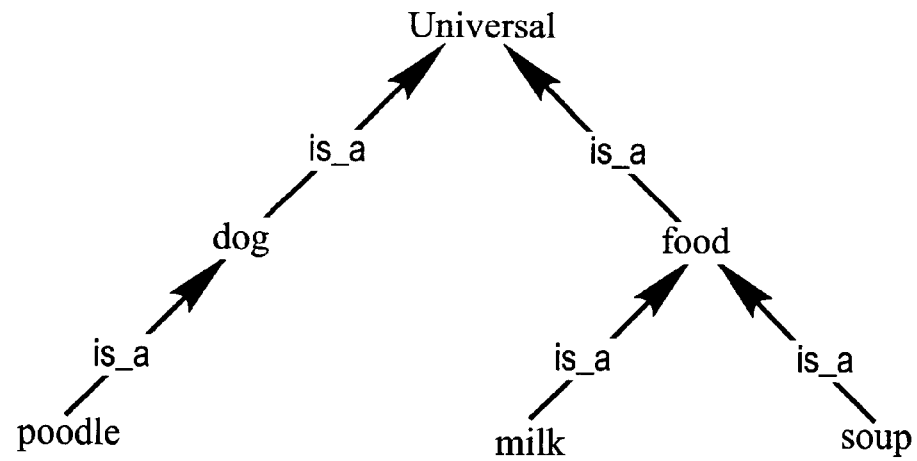
FIG. 9 illustrates graphs for a processing example according to a preferred embodiment of the invention.
Figure 9B:
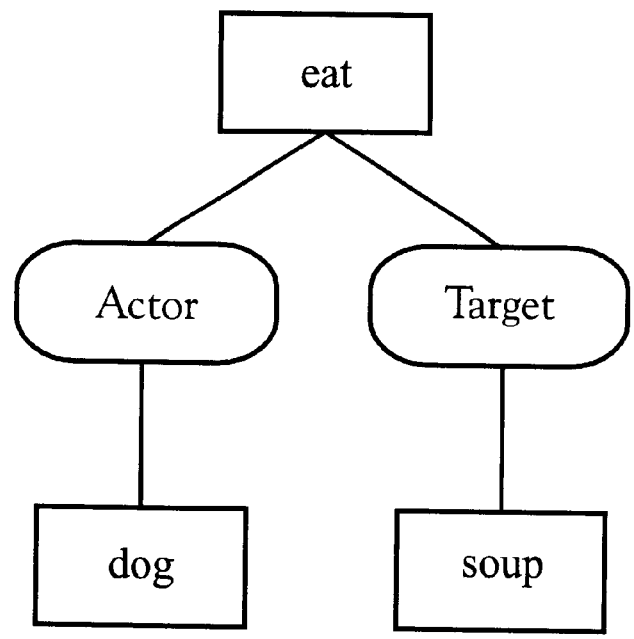

In the above example, "dog" is a subject, "soup" is an object and "eat" is a verb. When the syntactic relations of a sentence include a verb, a verb is used as the top of the graph. This is shown in FIG. 9b. Starting from the verb "eat" the graph branches to subject "dog" and object "soup". The syntactic relation is depicted in a relation node between the verb and the respective term, namely the dog as "actor" (subject) and the soup as "target" (object).

Further, a previously created semantic lattice derived in part from this sentence is used to expand each term of the sentence. As an example for semantic relations between terms only super-ordinated terms are considered for the sake of simplicity. As those skilled in the area will appreciate, the present invention is not limited to super-ordinated semantic relations. Any other kind of semantic relation may be alternatively or additionally used. Concepts are structured in the previously created semantic lattice according to a hierarchy starting from the most generic concept to the most specific. In this example, "dog" and "food" are not linked by a common super-ordinated term as they are two semantically separate concepts. Nevertheless these terms are linked to the most general concept in the semantic lattice which is called a "universal" concept. This universal concept is the theoretical starting point of the lattice. Similarly, verbs (and sometimes adjectives and adverbs if needed) also form part of the semantic lattice.

The afore-mentioned example illustrates the steps necessary to generate the internal representations of a database together with a particular graph of the semantic lattice. The particular steps are now described in detail.

In a first step 401, the syntactic relations of each sentence are extracted. For this purpose, preferably, a shallow parser is used. Such a shallow parser does not extract the complete set of all parsable syntactic relations but returns the most important and probable dependencies between terms in a sentence. The use of such a shallow parser reduces hardware complexity and computational effort without degradation in information retrieval effectiveness.

In general, it is the task of a parser to construct a phrase structure for a sentence. A parser cannot yet correctly resolve all sentences due to word sense ambiguity. For example, noun phrases cannot be reliable identified because of the prepositional phrase attachment problem. Particular syntactic parts of a sentence cannot always be reliably identified. One of these parts of a sentence which may be reliably identified is the noun group which is the head of a noun phrase or the verb group, comprising a verb together with its auxiliaries and intervening adverbs. These elements of a sentence are sufficient in order to improve information retrieval according to the present invention.

Another example is given below:

The poodle eats the soup

Subject: poodle-eat;

Direct-object: eat-soup.

Figure 10A:
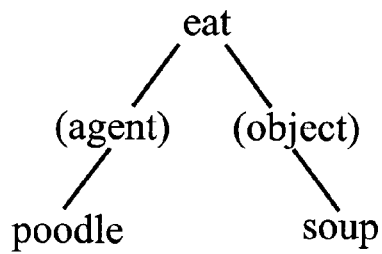
FIG. 10 illustrates examples of conceptual graphs.

Based on these syntactic dependencies, the preprocessing stage generates the knowledge representation of the documents. The graph resulting from the above example is shown in FIG. 10*a*.

The information retrieval system of the present invention builds a single graph for each document. Based on words common for two sentences of a document, the graph structure for a new sentence is added to the current graph by using previous nodes. Such an algorithms ensures that the graph is preferably kept as compact as possible. According to an alternative embodiment, a graph structure is constructed for each sentence of a document separately.

An example of a second sentence reads as follows:

The poodle drinks milk.

Figure 10B:
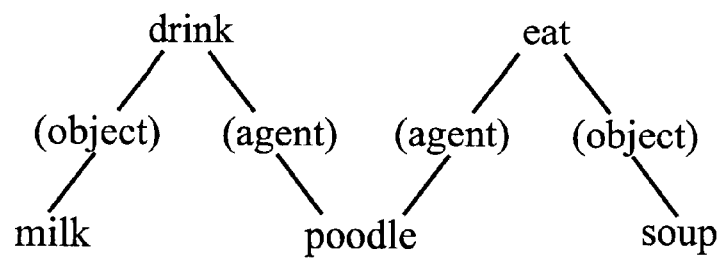

The information contained in this sentence may be added to the graph of the previous sentence (depicted in FIG. 10*a*) as shown in FIG. 10*b*. Both sentences are linked by the common word "poodle" as the subject.

The translation of syntactic relations into conceptual graph relations is indicated by step 403 in FIG. 4. Using these internal representations for a plurality of documents a database is generated. In an alternative embodiment, each document in a database is indexed by such a unique graph. This final step in the document preprocessing is shown in FIG. 4 by step 404.

In addition to the extracting step of syntactic relations and to translating these relations to conceptual graph relations, the preprocessing stage builds a conceptual or semantic lattice which is relevant for the whole database. Each new word used in a sentence is appended to the semantic lattice (step 402). Based on a thesaurus or ontology (as WordNet) the semantic relations between different terms are provided and used for building the semantic lattice. Semantic relations may be hyperonym relations, namely to use super-ordinated terms, synonym relations, etc. Such a hyperonym relation applied to the above example would return the word "dog" when inputting the word "poodle" and return the word "food" when inputting the word "soup". Words which have no common general concept are, according to a preferred embodiment, connected by the using the general term "universal". A semantic lattice for both above-given sentences connected by a "universal" is depicted in FIG. 9*a*.

Only one semantic lattice built for a set of documents in a database is stored together with the internal representations in the database.

Figure 5:
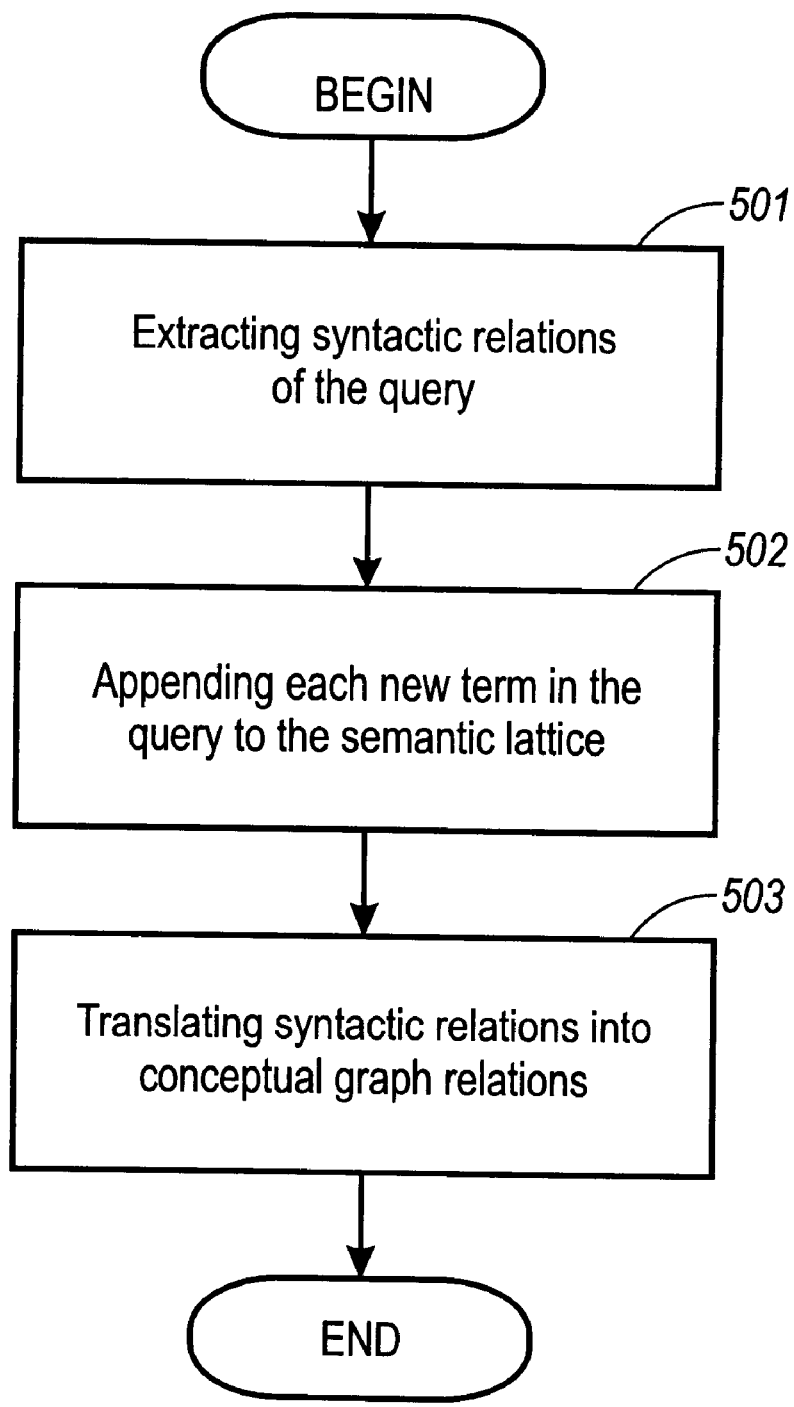
FIG. 5 is a flow-chart illustrating in more detail a query processing step of the process depicted in FIG. 3.

Turning now to FIG. 5 depicting the process of processing a query. A query input from a user is subjected to the same processing procedure as each document is subjected to in order to obtain a corresponding internal representation. The corresponding internal representations may subsequently be matched to each other in order to find the relevant documents.

In a first step, syntactic relation between terms of the query are extracted in step 501. In a preferred embodiment, a shallow parser is used in order to only extract the most relevant syntactic relations.

When processing a query, the terms of the query are appended to those already used to built the semantic lattice in the database (step 502). When assuming that the sentence The dog eats some soup.

is a document stored in a database and the sentence:

The poodle eats milk.

corresponds to a query, the semantic lattice as shown in FIG. 9*a* depicts the structure for the used nouns of both sentences.

Finally, in step 503, the syntactic relations are translated into conceptual graph relations. This step corresponds to step 403 in the document preprocessing stage. Another different query might be:

The dog eats something.

Figure 11:
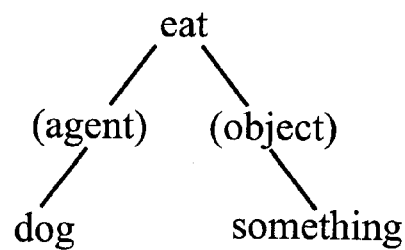
FIG. 11 illustrates an example for a query graph.

The corresponding conceptual graph is shown in FIG. 11.

Figure 12A:
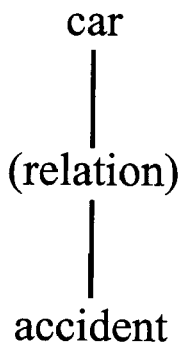
FIG. 12 illustrates an example for different graphs based on the same sentence.
Figure 12B:
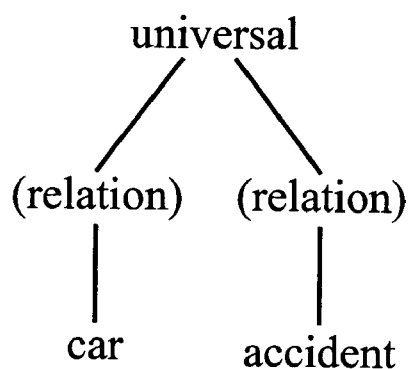

It may happen that different conceptual graphs may be generated from a single small query. Such ambiguity may be due to irresolvable syntactic relations between words of a small query or may also be due to mistakes when extracting dependencies. FIG. 12 gives an example for graphs which may be generated based from the query "car accident".

Those skilled in the art will appreciate that the position of the appending step 402, 502 in the flow charts of FIGS. 4 and 5 represents only one of many possible positions within the flow-charts as the appending step may be carried out independently from the other steps related to syntactic relations between terms.

Figure 6:
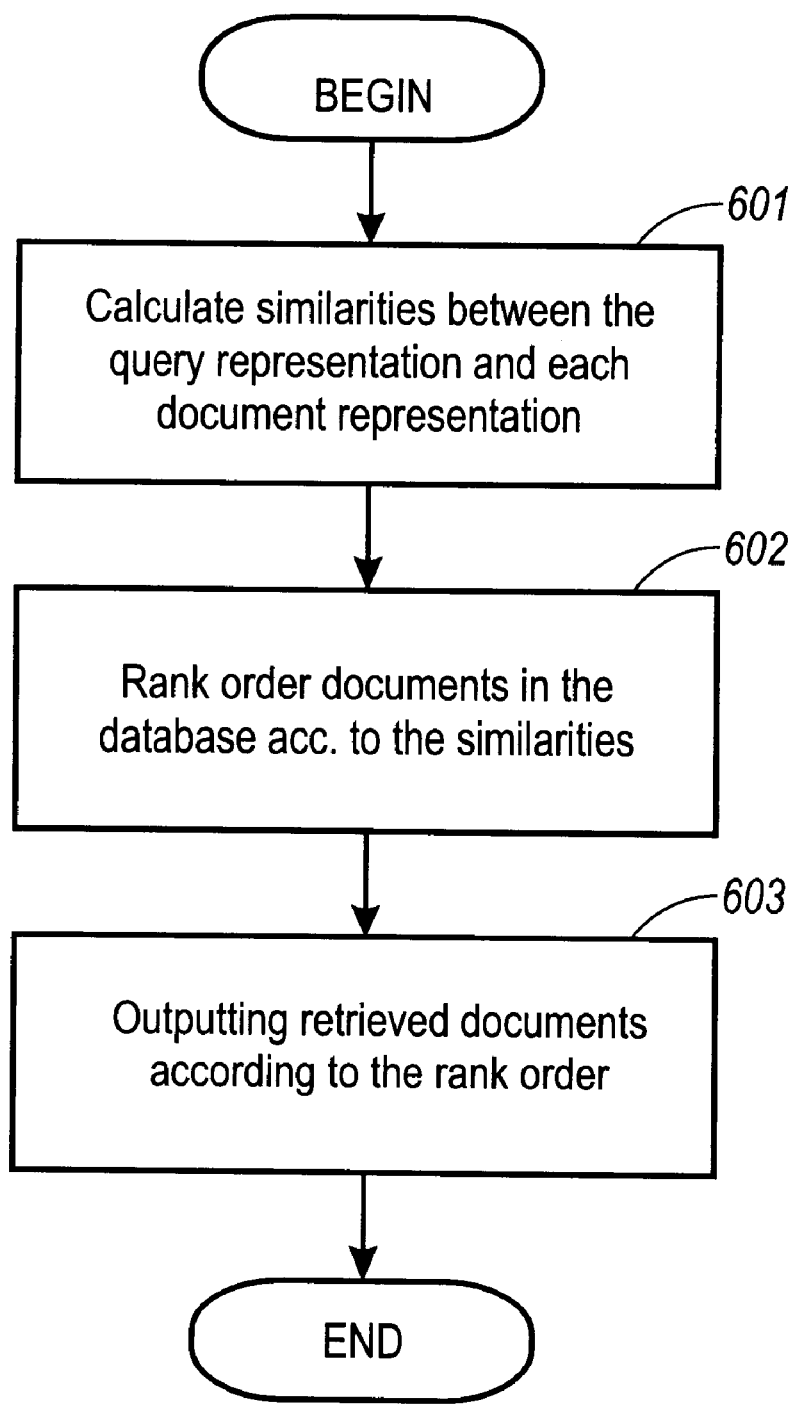
FIG. 6 is a flow-chart illustrating in more detail the retrieval and presentation of retrieved documents in the process depicted in FIG. 3.

Turning now to FIG. 6, the retrieval procedure of step 303 is described in more detail. For the retrieval of documents the query is projected onto each of the documents in the database. The projection is based on two graphs, namely the graphs of the query and of a document as input. The projection operation tries to match each node of the first graph with a node of the second graph. The projection operation is performed by comparing the terms and syntactic relations of the query graph with those of each document.

For determining similarity (step 601) between a query in a document, a multiple weighting procedure is employed. In general, a similarity measure is a type of a scoring function wherein the function associates a numeric value with (a pair of) sequences, with the idea that a higher value indicates greater similarity. In the present invention, a similarity measure is used to map the internal representation of the user's query to the internal representation of the documents. The internal representation of the query is then compared with the internal representations associated with the documents in the knowledge base. The document retrieval is based on the detection of similar semantic and syntactic structures.

In order to determine the relevance of a term of the query with respect to the database, the following values may be used to weight each term. First, a "term frequency value" (tf) may be used which counts the times each term occurs in a document. The more often a term occurs in a document, the more likely it is that the term is relevant to the document. When used alone, such term frequency value (tf) favors common words and long documents.

Second, a document frequency value (df) indicates how often a term occurs within all documents in the database. The more often a term occurs throughout all documents, the more poorly discriminates this term between the documents. A combination of the above terms provides a more reliable indication of the relevance of a single term for the document retrieval. When using the product of the term frequency value (tf) and the inverse of the document frequency (idf), a high value indicates that such a word occurs more often in this document than in average.

In a preferred embodiment of the present invention, the database provides such a tf-idf value (term frequency* inverse document frequency) for each term of the internal representations in the database. In a second step, corresponding weights are calculated for the terms of the query graph.

Thus, for each document $D_1$ a weight $W_{dik}$ for each term k is calculated:

$$D_i = W_{di1}, W_{di2}, \ldots$$

correspondingly the weights are calculated for each query term:

$$Q = W_{q1}, W_{q2}, \ldots$$

A term weight $w_{ik}$ for a term may be calculated as follows:

$$w_{ik} = \frac{tf_{ik} \log(N/n_k)}{\sqrt{\sum_{k=1}^{i} (tf_{ik})^2 [\log(N/n_k)]^2}}$$

In such a tf x idf-formula $tf_{ik}$ indicates the frequency of a term k in document $D_i$, $idf_k$ indicates the inverse document frequency of term k in all documents, N indicates a total number of documents, $n_i$ indicates the number of documents containing term k and $\log(N/n_k)$ corresponds to $idf_k$. Using the above formula, all weights fall within a range between zero and one.

Based on such weights calculated for each of the terms of the document graphs and the query graph, a similarity measure may be calculated as follows:

$$sim(Q, D_i) = \sum_k w_{qk} * w_{d_ik}$$

preferably, the normalized cosine measure is employed according to the following formula:

$$sim(Q, D_i) = \frac{\sum_k w_{qk} * w_{dik}}{\sqrt{\sum_k (w_{qk})^2 * \sum_k (w_{dik})^2}}$$

The similarity-computing step corresponds to step 601 in FIG. 6.

For returning a response to the query, the documents are rank ordered based on the obtained similarities and the retrieved documents are outputted according to the established rank order (steps 602 and 603).

According to a preferred embodiment of the present invention, the similarity computing procedure further takes additional weights into account. These additional weights result from the projection of the syntactic relation of the query graph to the syntactic relation of the corresponding term in the document graph. Based on this result, an additional weighting factor is introduced into the similarity calculation. The additional weighting procedure is shown in FIGS. 7 and 8.

Figure 7:
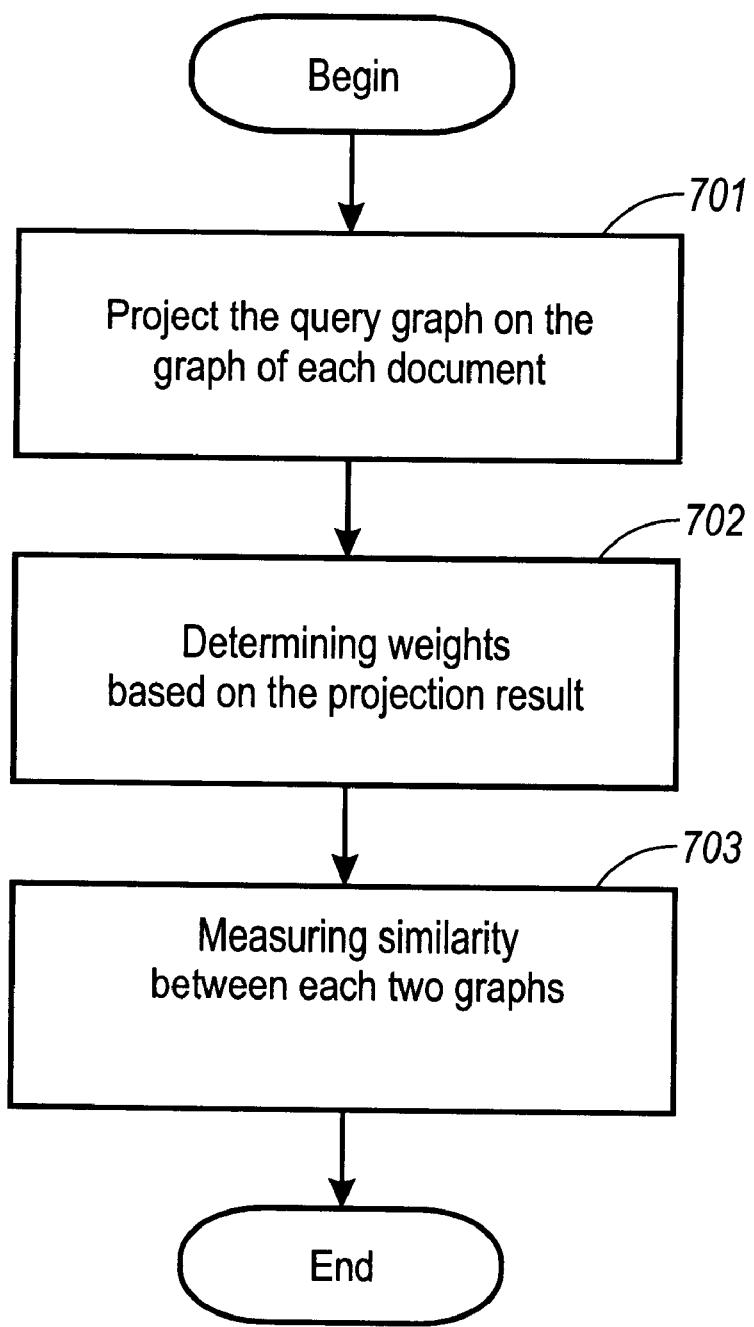
FIG. 7 is a flow-chart illustrating in more detail a compare step as depicted in FIG. 6.
Figure 8:
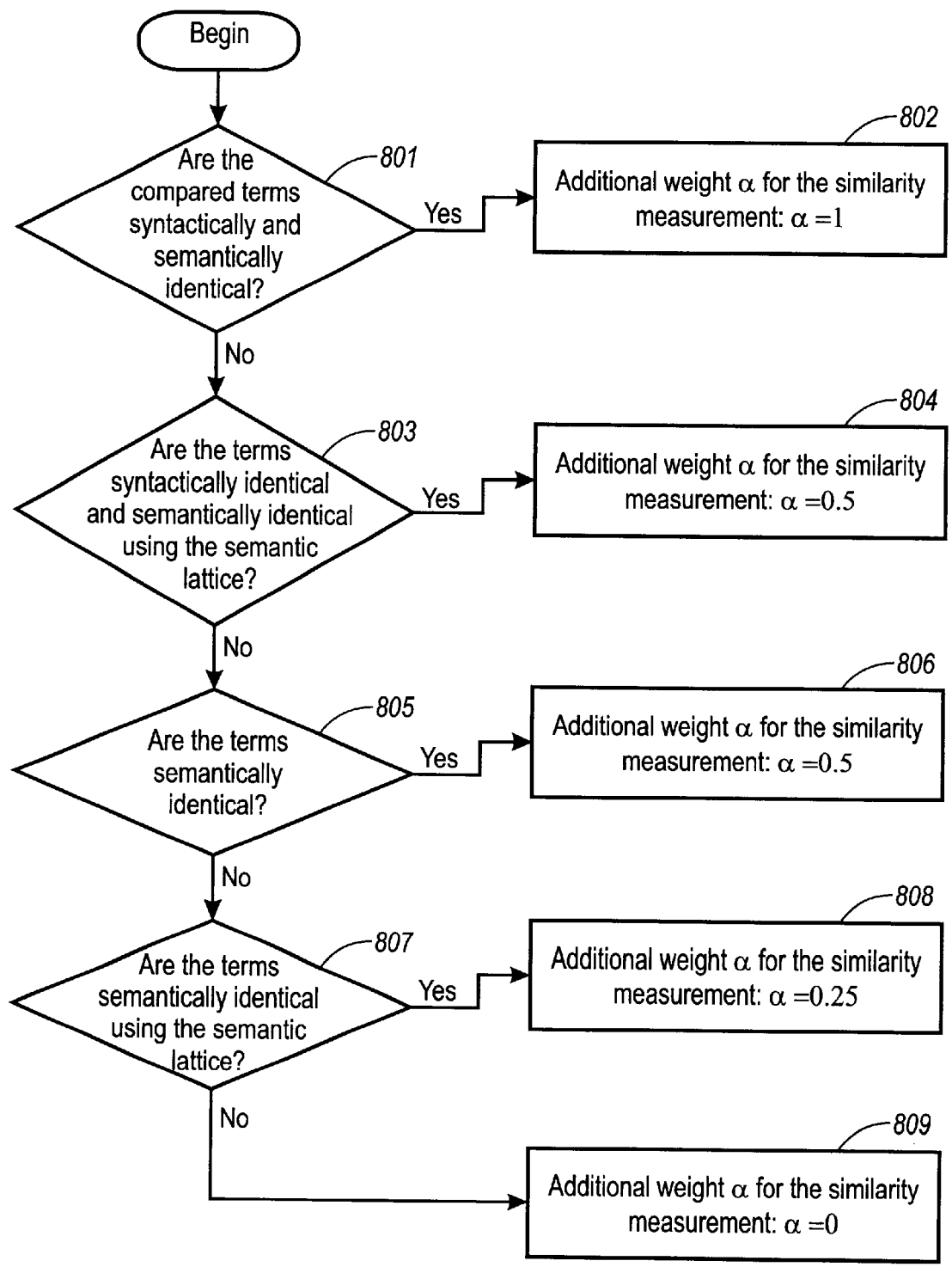
FIG. 8 is a flow-chart illustrating in more detail the step of determining weights as depicted in FIG. 7.

First, turning to FIG. 7 which indicates the steps for measuring similarity in general. Step 701 indicates to project the query graph on the graph of each document. Based on the projection results, additional weights are determined (step 702). The determining of these additional weights is illustrated in more detail in FIG. 8.

Figure 9C:
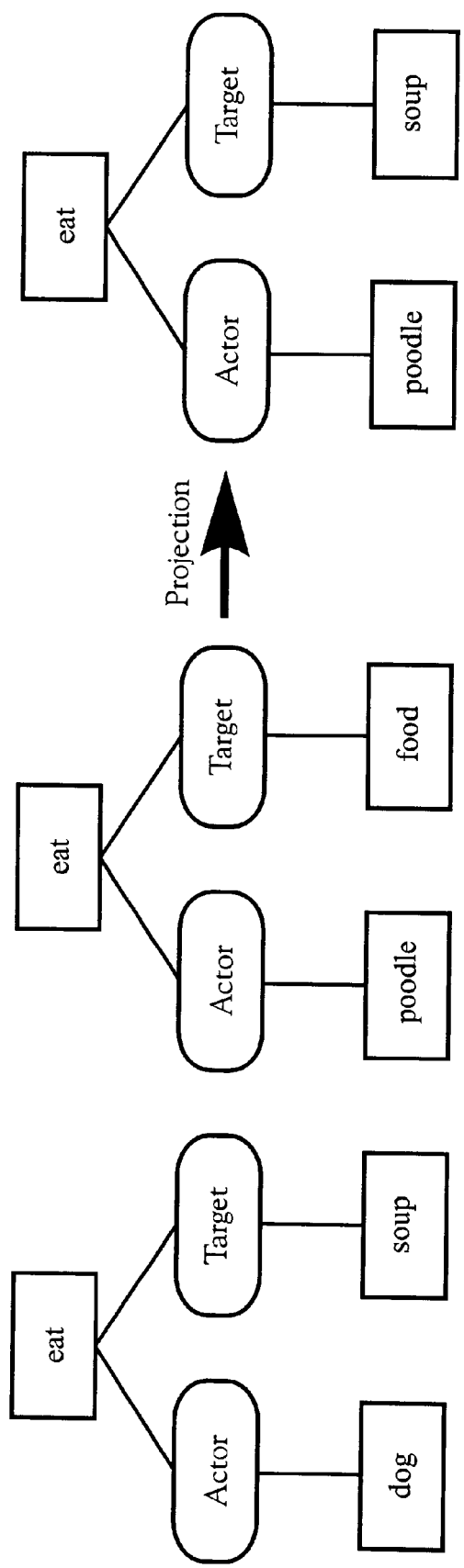

The additional weights are assigned depending on whether both terms namely that of the query and the document, are similar with respect to syntax and semantic. In step 801 it is decided whether both terms are syntactically and semantically identical. In case both terms are identical, the highest value is assigned (step 802) to the additional weighting factor a, preferably a value of one for a range of values between zero and one. A projection example for an identical projection is shown in FIG. 9c. The verb "eat" projects identically on the word "eat" of the document sentence.

In case both compared terms do not show identity with respect to syntax and semantic, it is determined in (step 803) whether both terms are syntactically identical and are semantically at least related to each other. This determination is made using the semantic lattice 103 which has stored the relations of all possible term combinations in advance. In the present example, both terms are semantically related when they are synonyms or when they are related through a super-ordinated term. An example for this is shown in FIG. 9a. The terms "milk" and "soup" are related through the super-ordinated term "food". Depending on the semantic distance of both terms, the maximum value (preferably one) assigned in step 802 is reduced accordingly and assigned in step 804 to factor α. In a preferred embodiment, the value of 0.5 is assigned to factor α in case of syntactic identity and semantic relation.

In case, both terms are syntactically not identical, it is determined (in step 805) whether both terms are nevertheless semantically identical. In case both terms are semantically identical but with different syntactical relations, a value is assigned to weighting factor α which is again reduced by a predetermined portion from the highest value which is assigned in step 802 (step 806). In a preferred embodiment, using the above range from one to zero, a value of 0.5 may be selected for factor α.

In case the terms are neither semantically identical nor syntactically identical, it is determined in step 807, whether these terms are at least semantically related using the semantic lattice 103. In case the only similarity between both terms is their semantic relation as stored in the semantic lattice, a further reduced value is assigned to weighting factor α (step 808). In a preferred embodiment, the assigned value is around 0.25.

In case both terms are neither syntactically identical nor semantically related to each other, the lowest value is assigned to weighting factor α (step 809). In the preferred embodiment, the value zero is assigned to α.

Returning to FIG. 7, in step 703 the similarity between each two graphs, namely that of the query and the corresponding one of each document, is computed preferably using the following formula:

$$sim(Qi, Dj) = \frac{\sum_{ik}\sum_{jk} \alpha_{ikjk} \cdot w_{ik} w_{jk}}{\sqrt{\sum_{k} w_{ik}^2 \sum_{k} w_{jk}^2}}$$

With respect to similarity computing or measuring, it will be appreciated by those of ordinary skill in the art that the technique according to the present invention may be likewise applied by different similarity measures.

As apparent from the foregoing, the invention allows for increasing recall and search precision at the same time without having a disadvantageous trade-off between both evaluation criteria. In particular, the semantic lattice permits to retrieve documents even when the request employs different words to describe the same concept. Referring to the previous example of a "car accident", a document with a reference to an "automobile accident" will be retrieved since the words "car" and "automobile" will be related in the semantic lattice. The projection of a graph A onto a graph B does not only succeed if each concept of A is equal and more general than the concepts of B. Additionally, a projection is successful if each concept of A is related to the lattice to each concept of B. Thus, a concept of A may be even more specific than a concept of B.

Further, a graph is a description of a set of relations between words. When a graph projects on another graph, both representations are very similar not only between their concepts but also between their relations between these concepts. The above described similarity index takes these two elements into account, the proximity of word meanings and their relations between the concepts to retrieve documents. This ensures an improvement of recall and search precision for small requests.

It will be appreciated by those skilled in the art, that this architecture for an information management of texts has a wider scope that just text retrieval. The representation of semantic information extracted from texts and a knowledge base associated with the lexical enlargement provided by a hierarchy of concepts give access to more complex operations on texts such as advanced searches, knowledge extraction, and automatic summarization, providing some specific customization of the knowledge base. This architecture is the core-basis for a large set of tools designed to perform knowledge management. According to this aspect, the present invention provides a document processing apparatus for providing internal representations of a plurality of documents. The apparatus comprises a parser for extracting the syntactic relations between terms in sentences of the documents. Moreover, the apparatus comprises a thesaurus memory providing semantically related terms for a plurality of terms. The semantically related terms are applied to a semantic lattice management unit for appending new terms to a semantic lattice which specifies semantic relations between the terms in the documents. Based on the extracted syntactic relations, the document processing apparatus creates an internal representation stored in a database memory.

A particular application of the present invention is the management of large online help documentation. If a problem has been identified and its solution should be searched over a large database of documents, this system will automatically augment the query to the neighboring concepts enlarging the scope of the query. Furthermore, the highest ranks will correspond to documents that link together concept relations in the same way as a query, thus improving the precision of the first documents displayed and reducing the time needed to find the information.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described therein in order to not unnecessarily obscure the invention described herein. Accordingly, it is to be understood that the invention is not to be limited by the specific illustrative embodiments.

What is claimed is:

1. A document retrieval method that retrieves documents from a database, the database comprising internal representations of documents wherein the internal representations include syntactic relations between terms of sentences of the documents and a semantic lattice for the terms of the documents in the database, the semantic lattice specifying the semantic relations between the terms, the method comprising the steps of:

a) receiving a database query,
   b) extracting syntactic relations between terms of the query,
   c) creating an internal representation of the query based on the terms of the query and the extracted syntactic relations between the terms of the query,
   d) appending new terms to the semantic lattice if the query includes terms not included in the semantic lattice in the database,
   e) projecting the query onto each of the documents in the database by comparing the internal representation and terms of the query to the internal representation and terms of the documents using the semantic lattice for comparing the terms and computing a similarity between the query and the documents in the database,
   f) ranking the documents in the database according to the computed similarities, and
   g) outputting documents as retrieved documents according to the rank order.

2. The method of claim 1, wherein the extracting step employs a shallow parser for extracting syntactic relations between terms of a sentence.

3. The method of claim 1, wherein the appending step for appending new terms to the semantic lattice receives a semantic relation for a current term from a thesaurus memory.

4. The method of claim 1, wherein the projecting step takes a semantic distance between a term of a query and a term of a document into account when computing similarity between the query and a document.

5. The method of claim 4, wherein the semantic distance between terms depends on the semantic similarity between both terms and being provided by the thesaurus memory.

6. The method of claim 4, wherein the semantic distance is zero if both terms are identical, the semantic distance takes a large value if both terms are semantically not related to each other, and the semantic distance takes an intermediate value if both terms are not identical but are semantically related to each other.

7. The method of claim 1, wherein the projecting step uses an additional weighting factor for computing the similarity between the query and a document, the weighting factor is large when the current term of the query and a term of the document are semantically and syntactically identical, the weighting factor is zero when both terms are neither semantically related to each other nor syntactically identical, the weighting factor takes an intermediate value when both terms are syntactically identical and are semantically related to each other and the weighting factor takes a smaller intermediate value when both terms are syntactically not identical but semantically related to each other.

8. The method of claim 1, wherein the step of creating an internal representation of the query generates a conceptual graph wherein each node of the graph either represents a term or a syntactic relation.

9. A document retrieval apparatus for retrieving documents from a database, the database comprising internal representations of documents wherein the internal representations include syntactic relations between terms of sentences of the documents and a semantic lattice for the terms of the documents in the database, the semantic lattice specifying semantic relations between the terms, the apparatus comprises:

a) a query input unit for receiving a query,
   b) a query processing unit for creating an internal representation of the query based on the terms of the query and syntactic relations between the terms of the query,
   c) a semantic lattice management unit for appending new terms to the semantic lattice if the query includes terms not included in the semantic lattice in the database,
   d) a matching unit that projects the query onto each of the documents in the database by comparing the internal representation of the query to the internal representation of a document using the semantic lattice for comparing the terms and computing a similarity between the query and the document, and
   e) a presentation unit for ranking the documents in the database according to the computed similarities and for outputting documents as retrieved documents according to the rank order.

10. The apparatus of claim 9, wherein said query processing unit comprises a parsing unit for extracting syntactic relations between terms of a sentence.

11. The apparatus of claim 9, wherein said query processing unit comprises a thesaurus memory including semantic relations for a plurality of terms.

12. The apparatus of claim 9, further comprising a document preprocessing unit for creating the internal representation of documents in the database, the document preprocessing unit using the syntactic relations extracted by a parsing unit and creating the semantic lattice for the database using semantic relations between terms of the documents provided by a thesaurus memory.

13. The apparatus of claim 9, further comprising a matching unit for computing a similarity between the query and a document wherein the matching unit takes a semantic distance between a term of the query and a term of a document into account when computing similarity.

14. The apparatus of claim 11, wherein the thesaurus memory further comprises a semantic distance for each stored semantic relation wherein the semantic distance depends on the semantic similarity between two terms.

15. The apparatus of claim 14, wherein the semantic distance is zero if both terms are identical, the semantic distance is large if both terms are semantically not related to each other, and the semantic distance takes an intermediate value if both terms are not identical but semantically related to each other.

16. The apparatus of claim 13, further using a weighting factor for computing the similarity between the query and a document, wherein the weighting factor takes a value of one if both terms are semantically and syntactically identical, wherein the weighting factor takes a value of zero if both terms are neither syntactically identical nor semantically related to each other, wherein the weighting factor takes an intermediate value if both terms are semantically related to each other and are syntactically identical, and wherein the weighting factor takes a smaller intermediate value if both terms are semantically related to each other but are syntactically not identical.

17. The apparatus of claim 9, wherein the internal representations of the documents in the database are in the form of a conceptual graph wherein each node of the graph either represents a term or a syntactic relation between terms.

18. A computer program product for use in a computer system that retrieves documents from a database, the database comprising internal representations of documents wherein the internal representations include syntactic relations between terms of sentences of the documents and a semantic lattice for the terms of the documents in the database, the semantic lattice specifying the semantic relations between the terms, the method comprising the steps of:

a) receiving a database query,
   b) extracting syntactic relations between terms of the query,
   c) creating an internal representation of the query based on the terms of the query and the extracted syntactic relations between the terms of the query,
   d) appending new terms to the semantic lattice if the query includes terms not included in the semantic lattice in the database,
   e) projecting the query onto the documents in the database by comparing the internal representation and terms of the query to the internal representation and terms of the documents using the semantic lattice for comparing the terms and computing a similarity between the query and the documents,
   f) ranking the documents in the database according to the computed similarities, and
   g) outputting documents as retrieved documents according to the rank order.

* * * * *